(12) United States Patent
Adaniya et al.

(10) Patent No.: US 10,348,105 B2
(45) Date of Patent: Jul. 9, 2019

(54) POWER SUPPLY APPARATUS, PROTECTION APPARATUS, AND PROTECTION METHOD

(71) Applicant: KABUSHIKI KAISHA TOYOTA JIDOSHOKKI, Kariya-shi, Aichi (JP)

(72) Inventors: Hiroko Adaniya, Kariya (JP); Takahiro Tsuzuku, Kariya (JP); Hiroyuki Nomura, Kariya (JP); Junichi Hatano, Kariya (JP); Ryusuke Hase, Kariya (JP)

(73) Assignee: KABUSHIKI KAISHA TOYOTA JIDOSHOKKI, Kariya-shi (JP)

( * ) Notice: Subject to any disclaimer, the term of this patent is extended or adjusted under 35 U.S.C. 154(b) by 103 days.

(21) Appl. No.: 15/520,341

(22) PCT Filed: Oct. 13, 2015

(86) PCT No.: PCT/JP2015/078970
§ 371 (c)(1),
(2) Date: Apr. 19, 2017

(87) PCT Pub. No.: WO2016/063760
PCT Pub. Date: Apr. 28, 2016

(65) Prior Publication Data
US 2017/0324257 A1 Nov. 9, 2017

(30) Foreign Application Priority Data
Oct. 23, 2014 (JP) ................................. 2014-216189

(51) Int. Cl.
*H02J 7/10* (2006.01)
*H02J 7/00* (2006.01)
(Continued)

(52) U.S. Cl.
CPC ............. *H02J 7/0026* (2013.01); *H01M 2/34* (2013.01); *H01M 10/482* (2013.01); *H02H 5/10* (2013.01);
(Continued)

(58) Field of Classification Search
USPC ....................................................... 320/118
See application file for complete search history.

(56) References Cited

U.S. PATENT DOCUMENTS 6,060,185 A 5/2000 Okutoh
9,031,801 B2 5/2015 Sugaya et al.
(Continued)

FOREIGN PATENT DOCUMENTS

JP   10-136576 A   5/1998
JP   11-283677 A   10/1999
(Continued)

OTHER PUBLICATIONS

International Search Report for PCT/JP2015/078970 dated Dec. 28, 2015.

*Primary Examiner* — Samuel Berhanu
(74) *Attorney, Agent, or Firm* — Sughrue Mion, PLLC

(57) ABSTRACT

When it has been determined according to a voltage detected by a voltage detecting unit 31 that a voltage detection line 23 between a focused-on battery 21 and the voltage detecting unit 31 has been broken, operations of each of switches 22 are controlled to separate a battery module 2 that includes the voltage detection line 23 from a power supply apparatus 1. When it has been determined according to the voltage detected by the voltage detecting unit 31 that the focused-on battery 21 has been overcharged or overdischarged, power input to, or output from, every battery module 2 is limited.

6 Claims, 4 Drawing Sheets

(51) Int. Cl.
*H02H 7/18* (2006.01)
*H01M 2/34* (2006.01)
*H01M 10/48* (2006.01)
*H02H 5/10* (2006.01)
*H01M 10/42* (2006.01)

(52) U.S. Cl.
CPC ............... *H02H 7/18* (2013.01); *H02J 7/00* (2013.01); *H02J 7/0045* (2013.01); *H01M 2010/4271* (2013.01)

(56) References Cited

U.S. PATENT DOCUMENTS

| | | | |
|---|---|---|---|
| 2008/0143298 A1 | 6/2008 | Yoshida | |
| 2009/0021220 A1* | 1/2009 | Choi | H01M 10/441 320/137 |
| 2009/0198399 A1 | 8/2009 | Kubo et al. | |
| 2013/0154360 A1 | 6/2013 | Ito | |
| 2013/0241480 A1 | 9/2013 | Kirimoto et al. | |

FOREIGN PATENT DOCUMENTS

| | | |
|---|---|---|
| JP | 2008-175804 A | 7/2008 |
| JP | 2012-050158 A | 3/2012 |
| JP | 2013-070441 A | 4/2013 |
| JP | 2013-078233 A | 4/2013 |
| JP | 2013165640 A | 8/2013 |
| JP | 2013-247773 A | 12/2013 |
| JP | 2014-050138 A | 3/2014 |
| WO | 2010/035567 A1 | 4/2010 |
| WO | 2011/111350 A1 | 9/2011 |

* cited by examiner

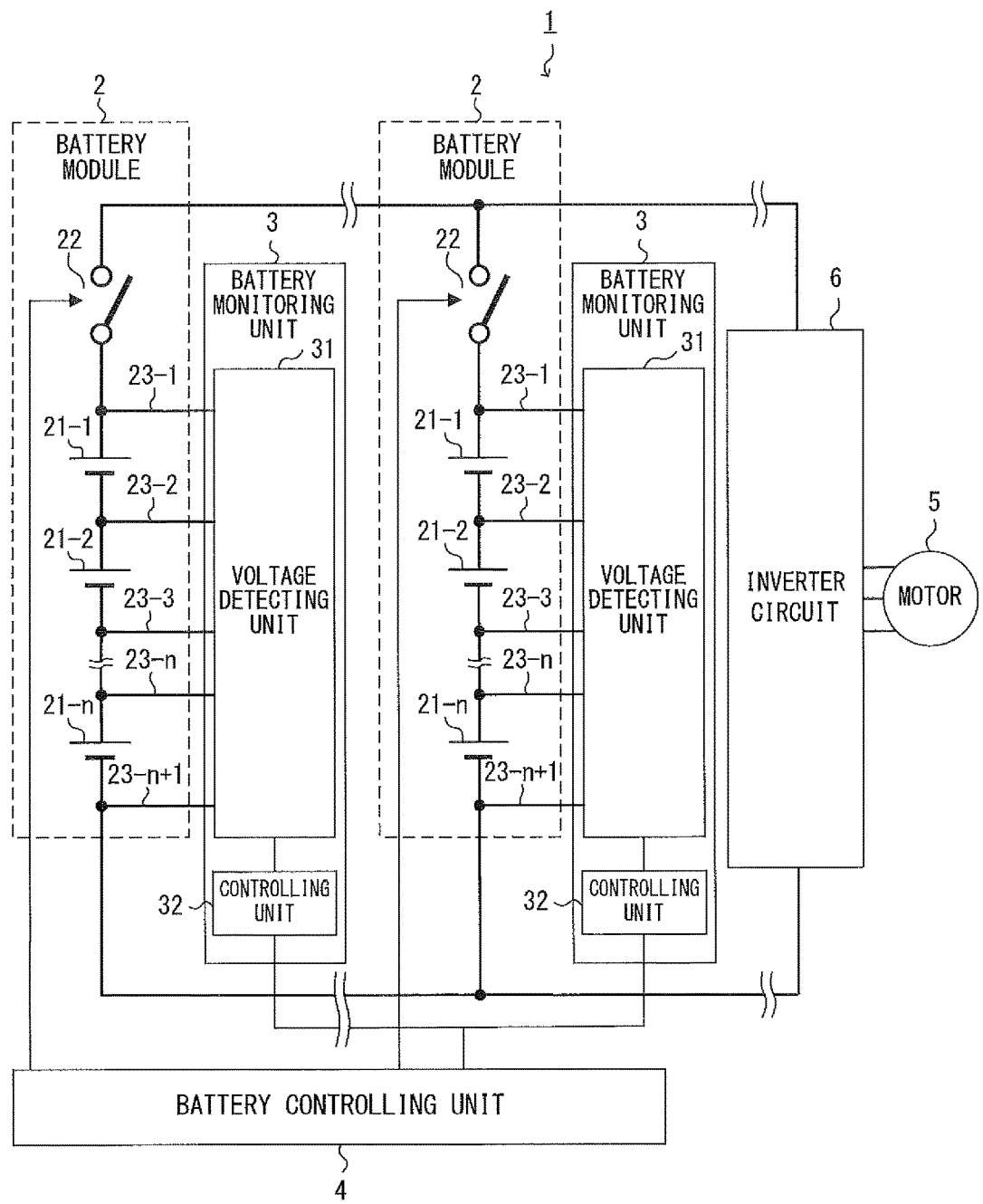
F I G. 1

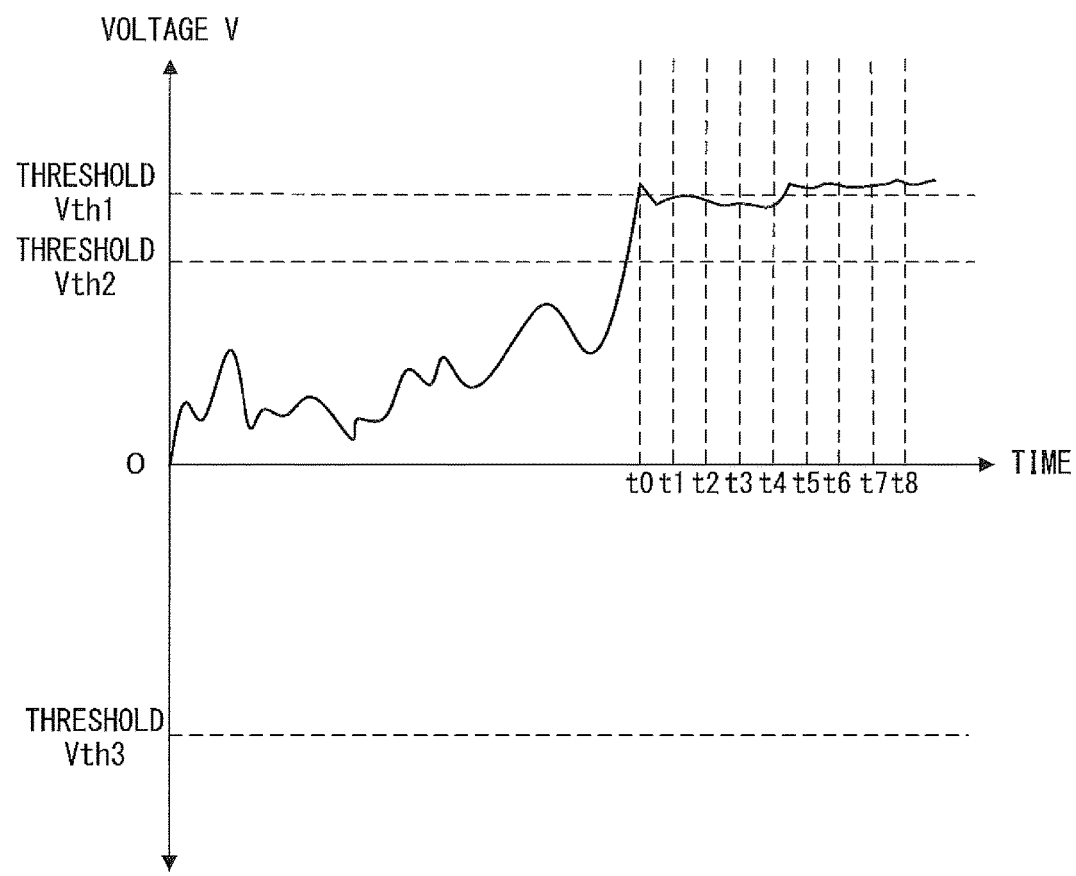
F I G. 4

POWER SUPPLY APPARATUS, PROTECTION APPARATUS, AND PROTECTION METHOD

CROSS REFERENCE TO RELATED APPLICATIONS

This application is a National Stage of International Application No. PCT/JP2015/078970 filed Oct. 13, 2015, claiming priority based on Japanese Patent Application No. 2014-216189 filed Oct. 23, 2014, the contents of all of which are incorporated herein by reference in their entirety.

TECHNICAL FIELD

The present invention relates to a power supply apparatus that includes a plurality of battery modules, a protection apparatus for the power supply apparatus, and a protection method.

BACKGROUND ART

Some power supply apparatuses that include a plurality of battery modules perform a protection process of electrically separating from the power supply apparatus a battery module in which an abnormality has occurred. A break in a voltage detection line between a battery and a voltage detecting unit, and overcharging or overdischarging of a battery, may be types of abnormalities of battery modules. See, for example, patent documents 1-4.

However, in a case where the same protective process is performed for all abnormalities that occur in a battery module, a power supply apparatus may possibly be excessively protected through separation of another battery module that does not need to be separated, or the same abnormality may occur in another battery module later, i.e., the power supply apparatus may be insufficiently protected.

PRIOR ART DOCUMENTS

Patent Documents

Patent document 1: Japanese Laid-open Patent Publication No. 2013-070441
Patent document 2: Japanese Laid-open Patent Publication No. 2013-247773
Patent document 3: Japanese Laid-open Patent Publication No. 2014-050138
Patent document 4: Japanese Laid-open Patent Publication No. 2012-050158

SUMMARY OF INVENTION

Technical Problem

An object of the present invention is to effectively protect a power supply apparatus that includes a plurality of battery modules in accordance with the type of an abnormality.

Solution to Problem

A power supply apparatus in accordance with an embodiment includes: a plurality of battery modules that each include a battery and a switch and that are connected in parallel to each other; a voltage detecting unit that detects a voltage of each battery; and a controlling unit.

When the controlling unit has determined according to the voltage detected by the voltage detecting unit that a voltage detection line between a focused-on battery and the voltage detecting unit has been broken, the controlling unit controls operations of each switch so as to separate a battery module that includes the voltage detection line from the power supply apparatus. When the controlling unit has determined according to the voltage detected by the voltage detecting unit that the focused-on battery has been overcharged or overdischarged, the controlling unit limits power input to, or output from, every battery module.

As described above, when a voltage detection line has been broken, the battery module that includes the voltage detection line is separated from the power supply apparatus, thereby preventing other battery modules without an abnormality from being separated from the power supply apparatus, with the result that the power supply apparatus is not excessively protected. When the focused-on battery has been overcharged or overdischarged, power input to, or output from, every battery module is limited, and hence the same abnormality will not occur in another battery module at a later time, thereby protecting the power supply apparatus.

Advantageous Effects of Invention

The present invention allows a power supply apparatus that includes a plurality of battery modules to be effectively protected in accordance with the type of an abnormality.

BRIEF DESCRIPTION OF DRAWINGS

FIG. 1 illustrates an example of a power supply apparatus in accordance with an embodiment;
FIG. 4 illustrates an exemplary change in a voltage of a focused-on battery.

DESCRIPTION OF EMBODIMENTS

Figure 2:
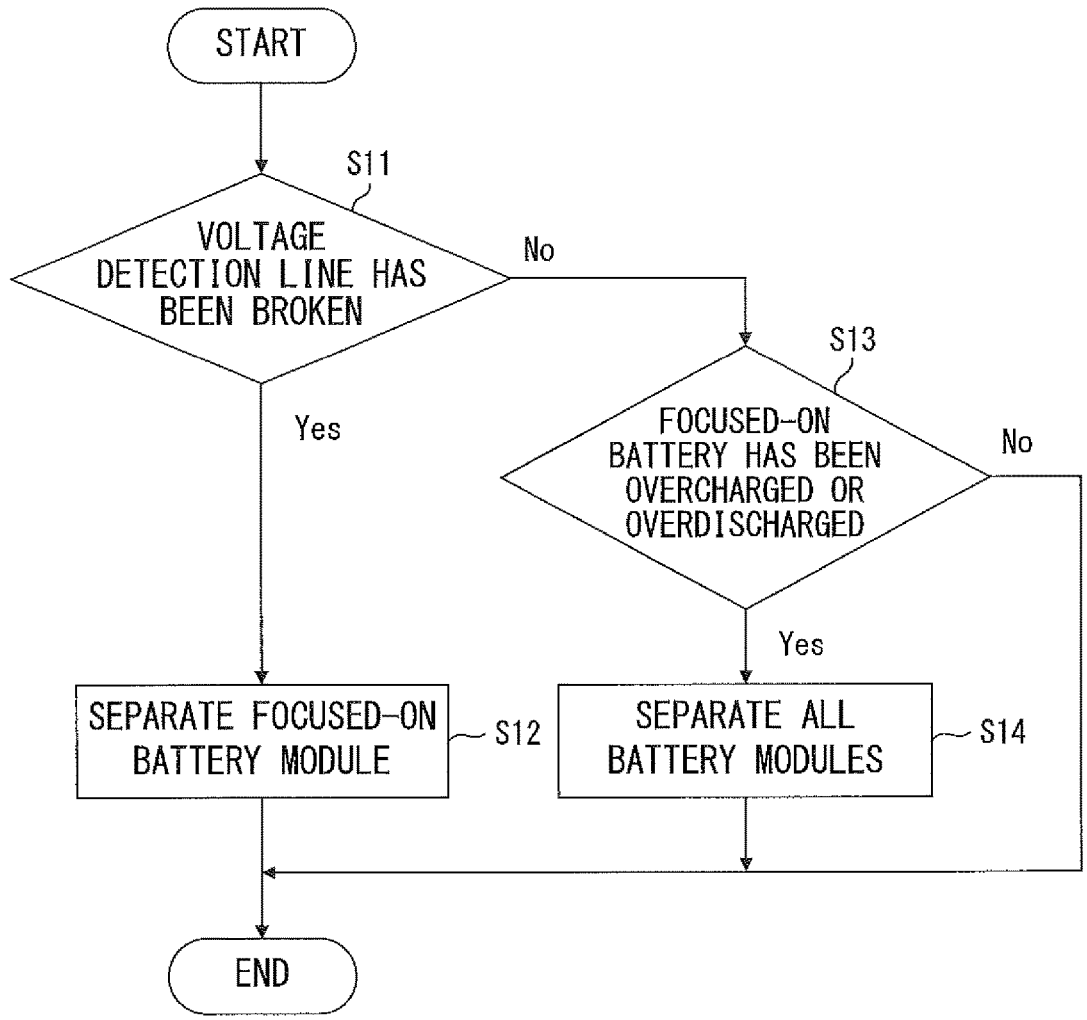
FIG. 2 is a flowchart illustrating exemplary operations of a battery controlling unit.

FIG. 1 illustrates an example of a power supply apparatus in accordance with an embodiment.

A power supply apparatus 1 depicted in FIG. 1 includes a plurality of battery modules 2, a plurality of battery monitoring units 3, and a battery controlling unit 4 (controlling unit). The power supply apparatus 1 is installed on a vehicle, e.g., a hybrid car or an electric vehicle, and supplies power to an inverter circuit 6 that operates a motor 5 for driving the vehicle.

The battery modules 2 each include a plurality of batteries 21 (21-1, 21-2, . . . , 21-$n$) connected in series to each other, and a switch 22 connected in series to the batteries 21. The battery modules 2 are connected in parallel to each other. Turning on a certain switch 22 electrically connects a battery module 2 that includes the certain switch 22 to the power supply apparatus 1; turning off the certain switch 22 electrically separates the battery module 2 that includes the certain switch 22 from the power supply apparatus 1.

The battery monitoring units 3 each include a voltage detecting unit 31 and a controlling unit 32. The battery controlling unit 4 and the controlling unit 32 include, for example, a CPU (Central Processing Unit), a multicore CPU, and a programmable device (FPGA (Field Programmable Gate Array), or a PLD (Programmable Logic Device)). The protection apparatus according to the claims includes, for example, the voltage detecting unit 31 and the battery controlling unit 4. The controlling unit 32 may be omitted. In this case, the battery controlling unit 4 functions as the controlling unit 32.

The voltage detecting unit 31 detects voltages V of the batteries 21-1 to 21-$n$ via voltage detection lines 23 (23-1, 23-2, . . . , 23-$n$, 23-$n$+1) connected to both ends of each of corresponding batteries 21-1 to 21-$n$. When, for example, the voltage detection line 23-2 has not been broken, the voltage detecting unit 31 detects a voltage between the voltage detection lines 23-1 and 23-2 as the voltage V of the battery 21-1. When the voltage detection line 23-2 has been broken, the voltage detecting unit 31 detects a voltage between the voltage detection lines 23-1 and 23-3 as the voltage V of the battery 21-1. That is, when the voltage detection line 23-2 has been broken, the voltage detecting unit 31 detects the total of the voltages of the batteries 21-1 and 21-2 as the voltage V of the battery 21-1.

The controlling unit 32 transmits data indicating a voltage detected by the voltage detecting unit 31 to the battery controlling unit 4 over a network such as a CAN (Controller Area Network).

According to the voltage V of the battery 21 that is indicated by the data transmitted by the controlling unit 32, the battery controlling unit 4 determines whether a voltage detection line 23 connected to the battery 21 has been broken. When, for example, the voltage V of the battery 21-1 is equal to or greater than a threshold Vth1, the battery controlling unit 4 determines that the voltage detection line 23-2 connected to the battery 21-1 has been broken. When the voltage V of the battery 21-1 is less than a threshold Vth4, the battery controlling unit 4 determines that a voltage detection line 23 connected to the battery 21-1 has been broken.

According to the voltage V of the battery 21 that is indicated by the data transmitted by the controlling unit 32, the battery controlling unit 4 also determines whether the battery 21 has been overcharged or whether it has been overdischarged. When, for example, the voltage V of the battery 21-1 is less than the threshold Vth1 and is equal to or greater than the threshold Vth2, the battery controlling unit 4 determines that the battery 21-1 has been overcharged. When the voltage V of the battery 21-1 is equal to or less than a threshold Vth3 and is equal to or greater than the threshold Vth4, the battery controlling unit 4 determines that the battery 21-1 has been overdischarged. It should be noted that threshold Vth1>threshold Vth2>threshold Vth3>threshold Vth4.

The battery controlling unit 4 changes a protective process for the power supply apparatus 1 in accordance with the type of an abnormality that occurs. When, for example, the battery controlling unit 4 has determined that the voltage detection line 23 has been broken, the battery controlling unit 4 controls operations of the switches 22 so as to electrically separate the battery module 2 that includes the voltage detection line 23 from the power supply apparatus 1. When the battery controlling unit 4 has determined that a battery 21 has been overcharged or overdischarged, the battery controlling unit 4 limits power input to, or output from, every battery module 2.

FIG. 2 is a flowchart illustrating exemplary operations of the battery controlling unit 4. Assume that the operations depicted in FIG. 2 are performed for every battery 21 at an abnormality detection timing. A battery 21 chosen as an abnormality detection target at the abnormality detection timing is hereinafter referred to as a "focused-on battery 21", and a battery module 2 that includes the focused-on battery 21 is hereinafter referred to as a "focused-on battery module 2". Further assume that the abnormality detection timing comes at, for example, a certain cycle.

The battery controlling unit 4 determines whether a voltage detection line 23 has been broken (S11).

When the battery controlling unit 4 has determined that the voltage detection line 23 has been broken (S11: Yes), the battery controlling unit 4 turns off a switch 22 provided at a focused-on battery module 2 that includes the voltage detection line 23, so as to electrically separate the focused-on battery module 2 from the power supply apparatus 1 (S12). That is, upon determining that the voltage detection line 23 has been broken (S11: Yes), the battery controlling unit 4 turns off only the switch 22 provided at a battery module 2 that includes the voltage detection line 23, so as to electrically separate only the battery module 2 that includes the voltage detection line 23 from the power supply apparatus 1 (S12). Subsequently, the battery controlling unit 4 waits until the next abnormality detection timing.

When the battery controlling unit 4 has determined that the voltage detection line 23 has not been broken (S11: No), the battery controlling unit 4 determines whether the focused-on battery 21 has been overcharged or whether it has been overdischarged (S13).

When the battery controlling unit 4 has determined that the focused-on battery 21 has been overcharged or overdischarged (S13: Yes), the battery controlling unit 4 turns off all switches 22 so as to electrically separate all battery modules 2 from the power supply apparatus 1 (S14). That is, upon determining that the focused-on battery 21 has been overcharged or overdischarged (S13: Yes), the battery controlling unit 4 turns off all switches 22 so as to electrically separate, from the power supply apparatus 1, not only a battery module 2 that includes the focused-on battery 21 judged to have been overcharged or overdischarged but also battery modules 2 that include batteries 21 that have not been overcharged or overdischarged (S14).

When the battery controlling unit 4 has determined that the focused-on battery 21 has not been overcharged or overdischarged (S13: No), the battery controlling unit 4 maintains operations of the switches 22 until the next abnormality detection timing.

In the power supply apparatus 1 in accordance with the present embodiment, when a voltage detection line 23 has been broken, a battery module 2 that includes the voltage detection line 23 is separated from the power supply apparatus 1, so that other battery modules 2 that do not have an abnormality caused therein can be prevented from being separated from the power supply apparatus 1, with the result that the power supply apparatus 1 is not excessively protected. As a result, when a line break abnormality has occurred in the voltage detection line 23, the vehicle can continue to be driven via evacuation running using battery modules 2 that have not been separated from the power supply apparatus 1.

In the power supply apparatus 1 in accordance with the present embodiment, when a battery 21 has been overcharged or overdischarged, all battery modules 2 are separated from the power supply apparatus 1, i.e., power input to, or output from, every battery module 2 is limited, thereby preventing the same abnormality from occurring later in another battery module 2 so that the power supply apparatus 1 can be protected.

As described above, the power supply apparatus 1 in accordance with the present embodiment is capable of effectively protecting the power supply apparatus 1 in accordance with the type of an abnormality that occurs in a focused-on battery module 2.

Other Embodiments

Figure 3:
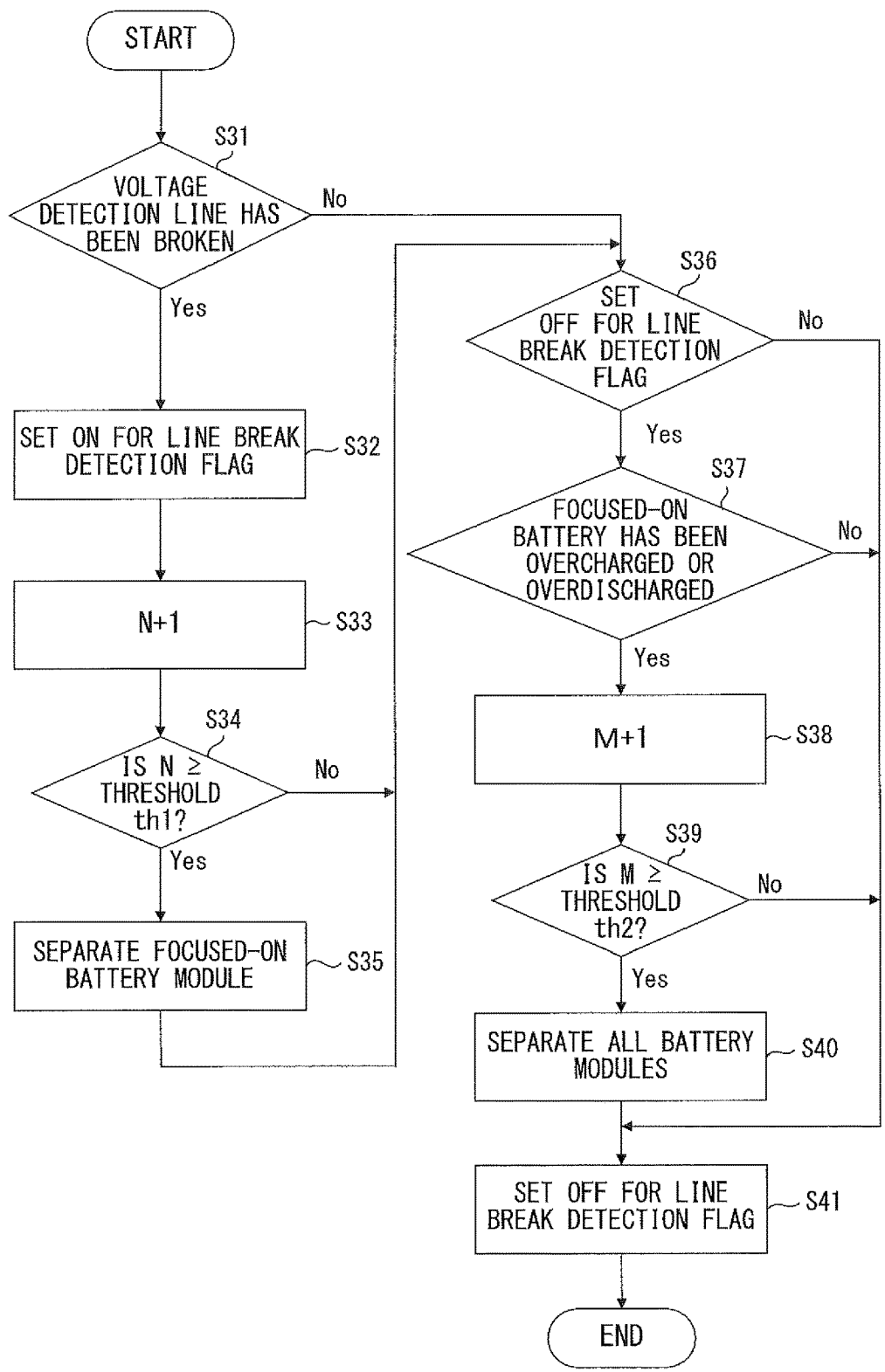
FIG. 3 is a flowchart illustrating exemplary operations of a battery controlling unit in a power supply apparatus in accordance with another embodiment.

FIG. 3 is a flowchart illustrating exemplary operations of a battery controlling unit 4 in a power supply apparatus 1 in accordance with another embodiment. Assume that the operations depicted in FIG. 3 are performed for every battery 21 at an abnormality detection timing. A battery 21 chosen as an abnormality detection target at the abnormality detection timing is hereinafter referred to as a "focused-on battery 21", and a battery module 2 that includes the focused-on battery 21 is hereinafter referred to as a "focused-on battery module 2". Further assume that the abnormality detection timing comes at, for example, a certain cycle.

The battery controlling unit 4 determines whether a voltage detection line 23 has been broken (S31).

When the battery controlling unit 4 has determined that the voltage detection line 23 has been broken (S31: Yes), the battery controlling unit 4 sets ON for a line break detection flag that corresponds to the focused-on battery 21 (S32), and adds 1 to an N that corresponds to the focused-on battery 21 (S33). For example, line break detection flags and Ns may be stored by a storage unit of the battery controlling unit 4.

When the battery controlling unit 4 has determined that N is equal to or greater than a threshold th1 (S34: Yes), the battery controlling unit 4 concludes that the voltage detection line 23 connected to the focused-on battery 21 has been broken, and the battery controlling unit 4 turns off the switch 22 provided at the focused-on battery module 2 so as to electrically separate the battery module 2 that includes the voltage detection line 23 from the power supply apparatus 1 (S35) and determines whether the line break detection flag is OFF (S36). That is, when the battery controlling unit 4 has determined that N is equal to or greater than the threshold th1 (S34: Yes), the battery controlling unit 4 concludes that the voltage detection line 23 connected to the focused-on battery 21 has been broken, turns off only the switch 22 provided at the battery module 2 that includes the voltage detection line 23, so as to electrically separate only the battery module 2 that includes the voltage detection line 23 from the power supply apparatus 1 (S35), and determines whether the line break detection flag is OFF (S36).

When the battery controlling unit 4 has determined that a voltage detection line 23 has not been broken (S31: No) or that N is less than the threshold th1 (S34: No), the battery controlling unit 4 determines whether the line break detection flag is OFF (S36).

When the battery controlling unit 4 has determined that the line break detection flag is off (S36: Yes), the battery controlling unit 4 determines whether the focused-on battery 21 has been overcharged or whether it has been overdischarged (S37).

When the battery controlling unit 4 has determined that the focused-on battery 21 has been overcharged or overdischarged (S37: Yes), the battery controlling unit 4 adds 1 to an M that corresponds to the focused-on battery 21 (S38). For example, Ms are stored in a storage unit of the battery controlling unit 4.

When the battery controlling unit 4 has determined that M is equal to or greater than the threshold th2 (S39: Yes), the battery controlling unit 4 concludes that the focused-on battery 21 has been overcharged or overdischarged, turns off all switches 22 so as to electrically separate all battery modules 2 from the power supply apparatus 1 (S40), and sets OFF for the line break detection flag (S41), finishing the abnormality detecting process. That is, when the battery controlling unit 4 has determined that M is equal to or greater than the threshold th2 (S39: Yes), the battery controlling unit 4 concludes that the focused-on battery 21 has been overcharged or overdischarged, turns off all switches 22 so as to electrically separate, from the power supply apparatus 1, not only the battery module 2 that includes the focused-on battery 21 judged to be overcharged or overdischarged but also battery modules 2 that include batteries 21 that have not been overcharged or overdischarged (S40), and sets OFF for the line break detection flag (S41), finishing the abnormality detecting process.

When the battery controlling unit 4 has determined that the line break detection flag is ON (S36: No), that the focused-on battery 21 has not been overcharged or overdischarged (S37: No), or that M is not equal to or greater than the threshold th2 (S39: No), the battery controlling unit 4 sets OFF for the line break detection flag (S41), finishing the abnormality detecting process.

FIG. 4 illustrates an exemplary change in a voltage V of a focused-on battery 21. Let "5" be a threshold th1, "6" be a threshold th2, and "0" be the initial values of N and M. Assume that a line break detection flag is OFF.

In the example depicted in FIG. 4, due to a voltage detection line 23 connected to the focused-on battery 21 that has been broken, the voltage of the focused-on battery 21-1 becomes equal to or greater than the threshold Vth1 at each of abnormality detection timings t0 and t5-t8. In addition, due to the influence of an error in voltage detected by the voltage detecting unit 31 that corresponds to the focused-on battery 21, the voltage V of the focused-on battery 21 is less than the threshold Vth1 and equal to or greater than the threshold Vth2 at each of abnormality detection timings t1-t4, despite the voltage detection line 23 connected to the focused-on battery 21 having been broken.

In such a situation, at the abnormality detection timing t0, the battery controlling unit 4 sets ON for the line break detection flag, and adds 1 to the N that corresponds to the focused-on battery 21.

Next, at each of the abnormality detection timings t1 to t4, the battery controlling unit 4 adds 1 to the M that corresponds to the focused-on battery 21. That is, N=1 and M=4 at the abnormality detection timing t4.

Subsequently, at each of the abnormality detection timings t5 to t7, the battery controlling unit 4 sets ON for the line break detection flag, and adds 1 to the N that corresponds to the focused-on battery 21. That is, N=4 and M=4 at the abnormality detection timing t7.

At the abnormality detection timing t8, the battery controlling unit 4 sets ON for the line break detection flag, adds 1 to the N that corresponds to the focused-on battery 21, and determines that N ("5") has become equal to or greater than the threshold th1 ("5"). Accordingly, the battery controlling unit 4 concludes that the voltage detection line 23 connected to the focused-on battery 21 has been broken, and turns off the switches 22 provided at the focused-on battery module 2 so as to electrically separate the battery module 2 that includes the voltage detection line 23 from the power supply apparatus 1.

As described above, the power supply apparatus 1 in accordance with this other embodiment is configured in a manner such that, after a voltage detection line 23 is judged to be broken at least once, a determination is not made as to whether the focused-on battery 21 has been overcharged or whether it has been overdischarged; such that, when it has been determined that, N, i.e., the total number of times the voltage detection line 23 connected to the focused-on battery 21 is judged to be broken, has become equal to or greater than the threshold th1, a conclusion is made that the voltage detection line 23 connected to the focused-on battery 21 has been broken, so that the focused-on battery 21 can be prevented from being mistakenly judged, due to an error in voltage V, e.g., an error in the detecting process, to be overcharged or overdischarged even when it has been neither overcharged nor overdischarged in reality, thereby making the abnormality determination more accurate.

The power supply apparatus 1 in accordance with this other embodiment is also capable of effectively protecting the power supply apparatus 1 in accordance with the type of an abnormality that occurs in a battery module 2.

In the present embodiment, the battery controlling unit 4 controls operations of the switches 22, but the controlling unit 32 of each battery monitoring unit 3 may control operations of the switch 22 of a corresponding battery module 2 using a voltage detected by the voltage detecting unit 31 associated with the controlling unit 32.

The power supply apparatus 1 in accordance with the present embodiment includes a plurality of voltage detecting units 31. However, the power supply apparatus 1 may include only one voltage detecting unit 31 that detects the voltages V of all batteries 21.

The power supply apparatus 1 in accordance with the present embodiment is configured in a manner such that, when the battery controlling unit 4 has determined that a focused-on battery 21 has been overcharged or overdischarged, or has concluded that the focused-on battery 21 has been overcharged or overdischarged, a current flowing through every battery module 2 is limited; in such a situation, in the example described above, all switches 22 are turned off so as to electrically separate all battery modules 2 from the power supply apparatus 1. In another example, however, the current flowing through every battery module 2 may be limited in such a situation.

For example, when the battery controlling unit 4 has determined that a focused-on battery 21 has been overcharged or overdischarged, or has concluded that the focused-on battery 21 has been overcharged or overdischarged, the battery controlling unit 4 decreases the value of a maximum input/output current of the power supply apparatus 1 that is to be sent from the battery controlling unit 4 to a driving controlling unit or charger on the vehicle side. When the maximum input/output current value of the power supply apparatus 1 is decreased, the driving controlling unit decreases the upper limit of an output current from the inverter circuit 6 to the motor 5, and the upper limit of a regenerative current from the inverter circuit 6 to the power supply apparatus 1. When the maximum input/output current value of the power supply apparatus 1 is decreased, the charger decreases the upper limit of an output current from the charger to the power supply apparatus 1. This limits the input/output current of the power supply apparatus 1 so that the current flowing through every battery module 2 can be limited.

For example, when the battery controlling unit 4 has determined that a focused-on battery 21 has been overcharged or overdischarged, or has concluded that the focused-on battery 21 has been overcharged or overdischarged, the battery controlling unit 4 sends an instruction to limit the driving to the driving controlling unit on the vehicle side. Upon receipt of the instruction to limit the driving, the driving controlling unit decreases the upper limit of an output current from the inverter circuit 6 to the motor 5, and the upper limit of a regenerative current from the inverter circuit 6 to the power supply apparatus 1. This limits the input/output current of the power supply apparatus 1 so that the current flowing through every battery module 2 can be limited.

When the battery controlling unit 4 has determined that a focused-on battery 21 has been heavily overcharged or overdischarged, or has concluded that the focused-on battery 21 has been heavily overcharged or overdischarged, the battery controlling unit 4 may control operations of the switches 22 so as to separate all battery modules 2 from the power supply apparatus 1. When the battery controlling unit 4 has determined that a focused-on battery 21 has been slightly overcharged or overdischarged, or has concluded that the focused-on battery 21 has been slightly overcharged or overdischarged, the battery controlling unit 4 may limit the current flowing through every battery module 2.

For example, when the voltage V of a focused-on battery 21 is equal to or greater than a threshold Vth2a and less than a threshold Vth1, the battery controlling unit 4 may determine that the focused-on battery 21 has been heavily overcharged; when the voltage V of a focused-on battery 21 is equal to or greater than a threshold Vth2 and less than the threshold Vth2a, the battery controlling unit 4 may determine that the focused-on battery 21 has been slightly overcharged; when the voltage V of a focused-on battery 21 is equal to or less than a threshold Vth3a and equal to or greater than a threshold Vth4, the battery controlling unit 4 may determine that the focused-on battery 21 has been heavily overdischarged; when the voltage V of a focused-on battery 21 is equal to or less than a threshold Vth3 and greater than the threshold Vth3a, the battery controlling unit 4 may determine that the focused-on battery 21 has been slightly overdischarged. Note that threshold Vth1>threshold Vth2a>threshold Vth2>threshold Vth3>threshold Vth3a>threshold Vth4. "Heavily overcharged" or "heavily overdischarged" indicates a state such that a focused-on battery 21 may possibly fail if, for example, a current continues to flow through the focused-on battery 21. "Slightly overcharged" or "slightly overdischarged" indicates a state such that a focused-on battery 21 may possibly be degraded faster if, for example, a current continues to flow through the focused-on battery 21.

EXPLANATION OF THE CODES

1 Power supply apparatus
2 Battery module
3 Battery monitoring unit
4 Battery controlling unit
5 Motor
6 Inverter circuit
21 Battery
22 Switch
23 Voltage detection line
31 Voltage detecting unit
32 Controlling unit

The invention claimed is:
1. A power supply apparatus comprising:
  a plurality of battery modules that each include a battery and a switch and that are connected in parallel to each other;
  a voltage detecting unit that detects a voltage of each of the batteries; and
  a controlling unit that
    when the voltage detected by the voltage detecting unit is equal to or greater than a first threshold, deter- mines that a voltage detection line between a focused-on battery and the voltage detecting unit has been broken, when the voltage detected by the voltage detecting unit is less than the first threshold and is equal to or greater than a second threshold that is less than the first threshold, determines that the focused-on battery has been overcharged, when the voltage detected by the voltage detecting unit is equal to or less than a third threshold that is less than the second threshold, and is equal to or greater than a fourth threshold that is less than the third threshold, determines that the focused-on battery has been overdischarged, when the voltage detected by the voltage detecting unit is less than the fourth threshold, determines that the voltage detection line between the focused-on battery and the voltage detecting unit has been broken, when the controlling unit has determined that the voltage detection line between the focused-on battery and the voltage detecting unit has been broken, controls operations of each of the switches so as to separate a battery module that includes the voltage detection line from the power supply apparatus, and when the controlling unit has determined that the focused-on battery has been overcharged or overdischarged, limits power input to, or output from, every battery module, wherein when the voltage detected by the voltage detecting unit is equal to or greater than a fifth threshold that is less than the first threshold and that is greater than the second threshold, and is less than the first threshold, the controlling unit controls operations of each of the switches so as to separate all of the battery modules from the power supply apparatus, when the voltage detected by the voltage detecting unit is equal to or greater than the second threshold and is less than the fifth threshold, the controlling unit decrease a value of a maximum input/output of the power supply apparatus, when the voltage detected by the voltage detecting unit is equal to or less than a sixth threshold that is less than the third threshold and that is greater than the fourth threshold, and is equal to or greater than the fourth threshold, the controlling unit controls operations of each of the switches so as to separate all of the battery modules from the power supply apparatus, and when the voltage detected by the voltage detecting unit is equal to or less than the third threshold and is greater than the sixth threshold, the controlling unit decrease a value of a maximum input/output of the power supply apparatus.

2. The power supply apparatus according to claim 1, wherein
when the controlling unit has determined that the focused-on battery has been overcharged or overdischarged, the controlling unit controls operations of each of the switches so as to separate all of the battery modules from the power supply apparatus, or limits a current flowing through every battery module.

3. The power supply apparatus according to claim 1, wherein
when the controlling unit has determined that the voltage detection line has been broken, the controlling unit does not determine whether the focused-on battery has been overcharged or whether it has been overdischarged.

4. The power supply apparatus according to claim 1, wherein
each of the battery modules includes a plurality of said batteries connected in series to each other, and
when the controlling unit has determined that a voltage detection line between any of the batteries and the voltage detecting unit has been broken, the controlling unit does not determine whether the focused-on battery has been overcharged or whether it has been overdischarged.

5. A protection apparatus that protects a power supply apparatus that includes a plurality of battery modules that each include a battery and a switch, by separating, from the power supply apparatus, a battery module in which an abnormality has occurred from among the plurality of battery modules, the protection apparatus comprising:
a voltage detecting unit that detects a voltage of each of the batteries; and
a controlling unit that
when the voltage detected by the voltage detecting unit is equal to or greater than a first threshold, determines that a voltage detection line between a focused-on battery and the voltage detecting unit has been broken, when the voltage detected by the voltage detecting unit is less than the first threshold and is equal to or greater than a second threshold that is less than the first threshold, determines that the focused-on battery has been overcharged, when the voltage detected by the voltage detecting unit is equal to or less than a third threshold that is less than the second threshold, and is equal to or greater than a fourth threshold that is less than the third threshold, determines that the focused-on battery has been overdischarged, when the voltage detected by the voltage detecting unit is less than the fourth threshold, determines that the voltage detection line between the focused-on battery and the voltage detecting unit has been broken, when the controlling unit has determined that the voltage detection line between the focused-on battery and the voltage detecting unit has been broken, controls operations of each of the switches so as to separate a battery module that includes the voltage detection line from the power supply apparatus, and when the controlling unit has determined that the focused-on battery has been overcharged or overdischarged, limits power input to, or output from, every battery module, and wherein when the voltage detected by the voltage detecting unit is equal to or greater than a fifth threshold that is less than the first threshold and that is greater than the second threshold, and is less than the first threshold, the controlling unit controls operations of each of the switches so as to separate all of the battery modules from the power supply apparatus, when the voltage detected by the voltage detecting unit is equal to or greater than the second threshold and is less than the fifth threshold, the controlling unit decrease a value of a maximum input/output of the power supply apparatus, when the voltage detected by the voltage detecting unit is equal to or less than a sixth threshold that is less than the third threshold and that is greater than the fourth threshold, and is equal to or greater than the fourth threshold, the controlling unit controls operations of each of the switches so as to separate all of the battery modules from the power supply apparatus, and when the voltage detected by the voltage detecting unit is equal to or less than the third threshold and is greater than the sixth threshold, the controlling unit decrease a value of a maximum input/output of the power supply apparatus.

6. A protection method for protecting a power supply apparatus that includes a plurality of battery modules that each include a battery and a switch, by separating, from the power supply apparatus, a battery module in which an abnormality has occurred from among the plurality of battery modules, the protection method comprising:

by using a controlling unit that controls operations of the switches, and when a voltage detected by a voltage detecting unit is equal to or greater than a first threshold, determining that a voltage detection line between a focused-on battery and the voltage detecting unit has been broken;

by using the controlling unit, and when the voltage detected by the voltage detecting unit is less than the first threshold and is equal to or greater than a second threshold that is less than the first threshold, determining that the focused-on battery has been overcharged, by using the controlling unit, and when the voltage detected by the voltage detecting unit is equal to or less than a third threshold that is less than the second threshold, and is equal to or greater than a fourth threshold that is less than the third threshold, determining that the focused-on battery has been overdischarged;

by using the controlling unit, and when the voltage detected by the voltage detecting unit is less than the fourth threshold, determining that a voltage detection line between the focused-on battery and the voltage detecting unit has been broken;

by using the controlling unit, and when the controlling unit has determined that the voltage detection line between the focused-on battery and the voltage detecting unit has been broken, controlling operations of each of the switches so as to separate a battery module that includes the voltage detection line from the power supply apparatus;

by using the controlling unit, and when the controlling unit has determined that the focused-on battery has been overcharged or overdischarged, limiting power input to, or output from, every battery module, by using the controlling unit, when the voltage detected by the voltage detecting unit is equal to or greater than a fifth threshold that is less than the first threshold and that is greater than the second threshold, and is less than the first threshold, controlling operations of each of the switches so as to separate all of the battery modules from the power supply apparatus, by using the controlling unit, when the voltage detected by the voltage detecting unit is equal to or greater than the second threshold and is less than the fifth threshold, decreasing a value of a maximum input/output of the power supply apparatus, by using the controlling unit, when the voltage detected by the voltage detecting unit is equal to or less than a sixth threshold that is less than the third threshold and that is greater than the fourth threshold, and is equal to or greater than the fourth threshold, controlling operations of each of the switches so as to separate all of the battery modules from the power supply apparatus, and by using the controlling unit, when the voltage detected by the voltage detecting unit is equal to or less than the third threshold and is greater than the sixth threshold, decreasing a value of a maximum input/output of the power supply apparatus.

* * * * *